United States Patent
Oskarsson et al.

(10) Patent No.: US 10,876,033 B2
(45) Date of Patent: Dec. 29, 2020

(54) NITROGEN-CONTAINING ANTI-AGGLOMERANTS FOR PRESERVING THE FLUIDITY OF FLUIDS CONTAINING GAS HYDRATES

(71) Applicant: NOURYON CHEMICALS INTERNATIONAL B.V., Arnhem (NL)

(72) Inventors: Hans Oskarsson, Stenungsund (SE); Ingemar Uneback, Svenshogen (SE)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 15/571,444

(22) PCT Filed: May 9, 2016

(86) PCT No.: PCT/EP2016/060256
§ 371 (c)(1),
(2) Date: Nov. 2, 2017

(87) PCT Pub. No.: WO2016/180745
PCT Pub. Date: Nov. 17, 2016

(65) Prior Publication Data
US 2019/0119553 A1    Apr. 25, 2019

(30) Foreign Application Priority Data
May 11, 2015 (EP) ..................... 15167153

(51) Int. Cl.
*C09K 8/52* (2006.01)
*C10L 3/10* (2006.01)
*F17D 1/17* (2006.01)
*F17D 3/12* (2006.01)
*C09K 8/54* (2006.01)

(52) U.S. Cl.
CPC ............. *C09K 8/52* (2013.01); *C09K 8/54* (2013.01); *C10L 3/107* (2013.01); *F17D 1/17* (2013.01); *F17D 3/12* (2013.01); *C09K 2208/22* (2013.01)

(58) Field of Classification Search
CPC ...... C09K 2208/22; C09K 8/52; C09K 8/524; C09K 8/665; C09K 8/68; C09K 8/805; C09K 8/62; C09K 8/80; C09K 8/528; C09K 8/94; C09K 2208/28; C09K 2208/32; C09K 8/035; C09K 8/572; C09K 8/5751; C09K 8/5753; C09K 8/5755; C09K 8/70; C09K 8/88; C09K 8/882; C09K 8/885; C09K 2208/10; C09K 2208/20; C09K 8/66; C09K 8/685; C09K 8/703; C09K 2208/12; C09K 2208/26; C09K 8/00; C09K 8/03; C09K 8/34; C09K 8/36; C09K 8/502; C09K 8/54; C09K 8/592; C09K 8/602; C09K 8/64; C09K 8/706; C09K 8/887; C09K 8/92; C09K 2208/34; C09K 8/38; C09K 8/42; C09K 8/422; C09K 8/467; C09K 8/487; C09K 8/58; C09K 8/594; C09K 8/60; C09K 8/605; C09K 8/86; E21B 43/267; E21B 37/06; E21B 43/26; E21B 36/003; E21B 43/025; E21B 33/13; E21B 36/006; E21B 41/02; E21B 43/24; E21B 43/247; E21B 2043/0115; E21B 21/00; E21B 43/122; E21B 43/16; E21B 43/166; E21B 43/34; E21B 47/00
See application file for complete search history.

(56) References Cited

U.S. PATENT DOCUMENTS

| | | | |
|---|---|---|---|
| 4,915,176 A | 4/1990 | Sugier et al. | |
| 4,973,775 A | 11/1990 | Sugier et al. | |
| 5,639,925 A | 6/1997 | Sloan, Jr. et al. | |
| 6,028,233 A | 2/2000 | Colle et al. | |
| 6,331,508 B1 | 12/2001 | Pakulski | |
| 8,211,842 B2 * | 7/2012 | Gerusz | C11D 1/662 252/175 |
| 2004/0200996 A1 | 10/2004 | Meyer | |
| 2008/0127858 A1 | 6/2008 | Thorstensson et al. | |
| 2010/0116642 A1 | 5/2010 | Krull et al. | |
| 2015/0126413 A1 | 5/2015 | Klomp | |
| 2016/0102240 A1 * | 4/2016 | Zhao | C09K 8/52 507/90 |

FOREIGN PATENT DOCUMENTS

| | | |
|---|---|---|
| CN | 102337110 A | 2/2012 |
| GB | 571591 | 8/1945 |
| GB | 832015 | 4/1960 |
| GB | 2 301 825 A | 12/1996 |
| GB | 2 349 889 A | 11/2000 |
| HU | T039-768 A | 10/1986 |
| WO | 93/25798 A1 | 12/1993 |
| WO | 96/34177 A1 | 10/1996 |

(Continued)

OTHER PUBLICATIONS

European Search Report filed in 15167153.4-1355 dated Feb. 11, 2015.

(Continued)

*Primary Examiner* — Kumar R Bhushan
(74) *Attorney, Agent, or Firm* — Lorenz & Kopf, LLP

(57) ABSTRACT

The present invention relates to the use of a specific group of acylated nitrogen-containing compounds as anti-agglomerants for gas hydrates. The anti-agglomerants are surface active nitrogen-containing compounds with 1-7 nitrogen atoms, which compounds have at least two hydrophobic groups with 6-24 carbon atoms, and where the hydrophobic groups are connected to the remainder of the molecule by an amine moiety or an amide moiety, and which compounds have at least one C2-C5 acyl group; or a salt thereof. The invention also relates to a method for inhibiting the agglomeration of gas hydrates in a conduit, and compositions comprising the gas hydrate anti-agglomerant, a corrosion inhibitor and/or a paraffin deposition inhibitor.

6 Claims, No Drawings

(56) References Cited

FOREIGN PATENT DOCUMENTS

WO     2005/116399 A1    12/2005
WO     2007/107502 A1     9/2007
WO     2010/104727 A1     9/2010

OTHER PUBLICATIONS

International Search Report and Written Opinion for PCT/EP2016/060256 dated Nov. 17, 2016.
International Preliminary Report on Patentability for PCT/EP2016/060256 dated Sep. 22, 2017.

* cited by examiner

NITROGEN-CONTAINING ANTI-AGGLOMERANTS FOR PRESERVING THE FLUIDITY OF FLUIDS CONTAINING GAS HYDRATES

This application is a national stage filing under 35 U.S.C. § 371 of PCT/EP2016/060256, filed May 9, 2016, which claims priority to European Patent Application No. 15167153.4, filed May 11, 2015, the contents of which are each incorporated herein by reference in their entirety.

The present invention relates to the use of a group of acylated nitrogen-containing compounds as anti-agglomerants for gas hydrates.

When low molecular hydrocarbon gases such as methane, ethane, propane, butane, and iso-butane are subjected to high pressure in the presence of water, a particular type of ice, a so-called gas hydrate, may be formed. The maximum temperature for this formation will depend on the gas pressure. At a sufficiently high pressure the gas hydrate can be stable up to +25° C.

The formation of gas hydrates has important practical implications in oil and gas production, particularly for the transport of natural gas in offshore pipelines where both high pressure and low temperature prevail. If no measures are taken, the pipeline is easily blocked by the formation of gas hydrates.

It has long been common practice to add either methanol or ethylene glycol to the gas/water or gas/water/oil stream in order to decrease the freezing point of the gas/water mixture. This method, which is called thermodynamic inhibition, will prevent primary formation of gas hydrates. However, it necessitates an addition of 10-60% of the amount of water present in the fluid, depending on the temperature and the gas pressure. This high level of addition will also make it necessary to recover the additive at the destination point. Altogether, this makes thermodynamic inhibition a rather expensive operation.

This in turn has led to the search for additives that can be used in much lower dosages, and this search has resulted in two principally different modes of action, kinetic inhibition and dispersion. In both cases the normal dosage of the additive is 1-3% of the water present in the gas/water or gas/water/oil stream.

Kinetic Inhibition of the Formation of Gas Hydrates

Kinetic inhibitors are products which delay the initial nucleation of gas hydrates. Kinetic inhibitors thus are only effective for a limited period of time, which is a disadvantage. These products normally are polymers, and several classes of polymers suitable as kinetic inhibitors have been described in WO 93/25798.

Dispersion of Gas Hydrates

When dispersants are used, the formation of small crystals of gas hydrates occurs, but the agglomeration of these crystals is prevented. This is mainly expected to be due to adsorption of the dispersant on the surfaces of initially formed crystals of gas hydrate. The dispersants typically are surface-active agents i.e. they contain at least one hydrophilic (polar) and at least one hydrophobic (nonpolar, oleophilic) group. The dispersant will adsorb with its polar end toward the gas hydrate crystal, turning its nonpolar, hydrocarbon end outwards. The crystals thus are made oleophilic and can easily be dispersed in the liquid hydrocarbon phase. Dispersants thus are only effective when such a liquid oil phase is present. This will normally be the case in the pipeline from the production well to the first treatment station, when the fluid stream contains both gas and oil as well as water. The adsorbed layer of dispersants on the crystals will also prevent them from growing together into large aggregates, which otherwise may cause complete blockage of the pipe line. This property of the dispersants has resulted in their usually being named anti-agglomerants, and this term will be used throughout this application.

In U.S. Pat. No. 4,915,176 a method of transporting a hydrate forming fluid is disclosed, where an additive is injected into the fluid for reducing the tendency to agglomeration of the hydrates so as to obtain hydrates in the dispersed form. The additives used in the working examples are fatty acid diethanolamides having different alkyl chain lengths, sodium dioctylsulfosuccinate, and sorbitan monolaurate.

In WO 96/34177 quaternary ammonium surfactants are described where at least two butyl, pentyl or iso-pentyl groups are attached to the nitrogen atom, which also carries one or two long alkyl glycol ether chains. Some products with this configuration have been shown to be good gas hydrate anti-agglomerants. The production process for these types of compounds contains several steps and is rather time-consuming.

In U.S. Pat. No. 4,973,775 a process for delaying the formation and/or reducing the agglomeration tendency of gas hydrates is disclosed wherein hydroxycarbylamides and polyhydroxycarbylamides are used. Suggested compounds are described by the general formulae (1), (2) and (3)

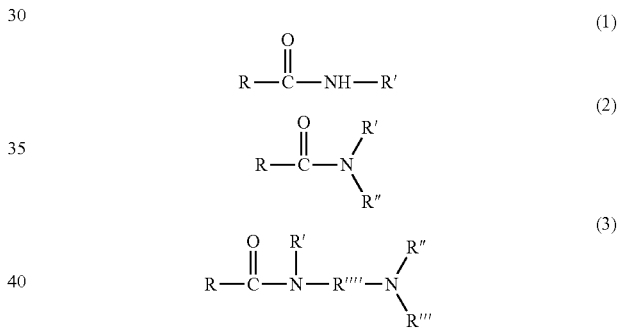

where R—C=O is a radical of the carboxylic acid and comprises 4 to 28 carbon atoms, R', R" and R'" are hydroxycarbyl radicals and R"" is an alkylenic radical of the type $C_nH_{2n}$, and n is a whole number of 1 or more. Only compounds according to formula (2) are disclosed, such as coconut diethanolamide, ethoxylated coconut diethanolamide, rapeseed diethanolamide or diethanolamides from other acids.

WO 2007/107502 describes a number of surface active non-quaternary nitrogen-containing compounds as anti-agglomerants, which have at least one hydrophobic group with 6-24 carbon atoms and are optionally ethoxylated, and which have at least one C2-C3 acyl group, and/or at least one hydroxyalkyl group with 3-4 carbon atoms. In all formulae given there is just one hydrophobic group present, and the hydrophobic group may be a hydrocarbyl group or an amide group.

GB 2 349 889 discloses a method for inhibiting the formation, agglomeration and plugging of gas hydrates in a fluid containing hydrate forming constituents. The additives described belong to a class of compounds including the group —C(=O)NR$_1$R$_2$, where the total number of carbon atoms in R$_1$ and R$_2$ should not exceed 7.

Although various options are provided to overcome the problem of agglomeration, there is still a need for improved anti-agglomerants for gas hydrates.

DESCRIPTION OF THE INVENTION

The aim of the present invention is to find new anti-agglomerants for gas hydrates that are efficient in seawater, brackish and/or in fresh water and are more economically attractive than previously known compounds.

It has now surprisingly been found that a surface-active nitrogen-containing compound with 2-7, preferably 2-5, more preferably 2-4, most preferably 2-3, amide groups, which compound has at least one hydrocarbyl group with 6-24, preferably 8-24, and most preferably 8-18 carbon atoms, connected to a nitrogen atom, and where the acyl groups of the amide bonds are having 2-24 carbon atoms, provided that at least one of the acyl groups is having 6-24 carbon atoms; is an efficient anti-agglomerant for gas hydrates in both salt and fresh water. A further advantage is that these compounds also have the ability to act as corrosion inhibitors. According to an unproven theory, it is believed that the essential acyl groups have an improved adhesion to the gas hydrate surface, and thereby facilitate dispersion and prevent agglomeration.

The compounds according to the invention is suitably described by the formula

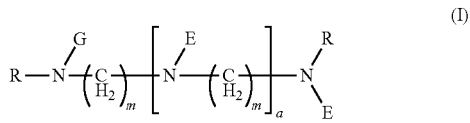

where R is H or a hydrocarbyl group having 2-24, preferably 6-24, more preferably 8-24 and most preferably 8-18 carbon atoms, G is a hydrocarbyl group having 6-24 carbon atoms or the group E; each E is independently H, $CH_3$, $-CH_2CH_3$ or an acyl group $-C(=O)R_1$, wherein each $-C(=O)R_1$ group, independently, is an acyl group having 2-24 carbon atoms; provided that at least one, preferably at least 2, of the $-C(=O)R_1$ groups is an acyl group having 2-5 carbon atoms, and at least one $-C(=O)R_1$ is an acyl group having 6-24 carbon atoms; and provided that when both R is H, then there are at least two of $-C(=O)R_1$ that are an acyl group having 6-24 carbon atoms; m is 2 or 3, preferably 3, a=1-5, preferably 1-4, more preferably 1-3, and most preferably 1-2; or the formula

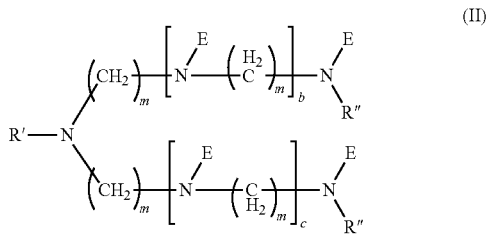

wherein R' is a hydrocarbyl group having 6-24, more preferably 8-24 and most preferably 8-18 carbon atoms, R" is H, $CH_3$ or $-CH_2CH_3$; m, and the group E have the same meaning as in formula (I); provided that at least one of the $-C(=O)R_1$ groups is an acyl group having 6-24 carbon atoms, and at least one $-C(=O)R_1$ is an acyl group having 2-5 carbon atoms; and b and c independently is a number 0-2.

One embodiment of formula I are compounds where a=2, m=2 and R=H; wherein G is a group E, and wherein two of the groups E is an acyl group having 6-24 carbon atoms and two is an acyl group having 4 carbon atoms.

Another embodiment of formula I are compounds where a=3, m=2 and R=H; wherein G is a group E, and wherein two of the groups E is an acyl group having 6-24 carbon atoms, two is an acyl group having 2 carbon atoms and one is an acyl group having 4 carbon atoms.

Another embodiment of formula I are compounds where a=1, m=3 and one R is a hydrocarbyl group having 8-24 carbon atoms; wherein G is a group E, and wherein one of the groups E is an acyl group having 6-24 carbon atoms, one is an acyl group having 4 carbon atoms and one is an acyl group having 2 carbon atoms.

Another embodiment of formula I are compounds where a=1, m=3 and one R is a hydrocarbyl group having 8-24 carbon atoms; wherein G is a group E, and wherein one of the groups E is an acyl group having 6-24 carbon atoms and two is an acyl group having 4 carbon atoms.

Another embodiment of formula I are compounds where a=2, m=3 and one R is a hydrocarbyl group having 8-24 carbon atoms; wherein G is a hydrocarbyl group having 8-24 carbon atoms, and wherein the above-mentioned hydrocarbyl groups G and R are situated on the same carbon atom; and two of the groups E is an acyl group having 4 carbon atoms and one is an acyl group having 2 carbon atoms.

One embodiment of formula II is a compound wherein the non-terminal R' is a hydrocarbyl group having 8-24 carbon atoms, m=3, one of the groups E is an acyl group having 8-24 carbon atoms, one of the groups E is an acyl group having 4 carbon atoms, and b and c are 0.

Another embodiment of formula II is a compound wherein the non-terminal R' is a hydrocarbyl group having 8-24 carbon atoms, m=3, one of the groups E is an acyl group having 8-24 carbon atoms, one is an acyl group having 4 carbon atoms, two are an acyl group having 2 carbon atoms, and b and c are 1.

The compounds having these formulae or their salts were found to be very efficient anti-agglomerants for gas hydrates. Optionally, products of formula I or II may be derivatized. For example, the products having basic nitrogens available may be quaternized in a conventional way.

The above compounds are obtainable by methods well known in the art. Compounds of formula I where m is 3, are obtainable by reacting an alkyl polyamine or a dialkyl polyamine with a mixture of suitable anhydrides, fatty acids, or fatty acid chlorides. The products obtained will obviously consist of a mixture of molecules having the different acyl groups statistically distributed, and formula I will thus only show "the average" molecule.

Compounds of formula I where m is 2, are obtainable by reacting a polyethylene polyamine with a mixture of suitable anhydrides, fatty acids, or fatty acid chlorides.

Compounds of formula II are obtainable by acylating a suitable alkyl polyamine containing a tertiary mono(fatty alkyl)amino group with a mixture of suitable anhydrides, fatty acids, or fatty acid chlorides.

Suitable alkyl polyamines that can be used as starting materials for compounds of formula I where m is 3 are e.g. linear (fatty alkyl)dipropylenetriamines according to formula $RNHCH_2CH_2CH_2NHCH_2CH_2CH_2NH_2$, wherein R is an aliphatic group having 6-24 carbon atoms. Other examples are N-alkyl tripropylenetetramines and N-alkyl tetrapropylenepentamines. Further examples are di(fatty alkyl)triamines according to formula $R_2NCH_2CH_2CH_2NHCH_2CH_2CH_2NH_2$ wherein R is an aliphatic group having 6-24 carbon atoms. Another example is N,N-dialkyl tripropylenetetramines. Suitable polyamines that may be used as starting materials for compounds of formula I where m is 2 are for example dietylenetriamine, triethylenetetramine, tetraethylenepentamine, pentaethylenehexamine and hexaethyleneheptamine. Suitable alkylpolyamines that can be used as starting materials for compounds of formula II are branched (fatty alkyl)triamines (Y-triamines) of formula $R'N(CH_2CH_2CH_2NH_2)_2$, wherein R' is an aliphatic group having 6-24, preferably 8-24, carbon atoms, or branched (fatty alkyl) pentaamines of formula $R'N(CH_2CH_2CH_2NHCH_2CH_2CH_2NH_2)_2$, wherein R' is has the same meaning as above.

Examples of suitable fatty amines for use as starting materials for compounds of formula I are N-(n-decyl)-N'-(3-aminopropyl)-1,3-propane diamine, N-(n-dodecyl)-N'-(3-aminopropyl)-1,3-propane diamine, N-(coco alkyl)-N'-(3-aminopropyl)-1,3-propane diamine, N-(rape seed alkyl)-N'-(3-aminopropyl)-1,3-propane diamine, N-(soya alkyl)-N'-(3-aminopropyl)-1,3-propane diamine, N-oleyl-N'-(3-aminopropyl)-1,3-propane diamine, N-(tallow alkyl)-N'-(3-aminopropyl)-1,3-propane diamine, N-erucyl-N'-(3-aminopropyl)-1,3-propane diamine, N-(3-aminopropyl)-N'-[3-(9-decylamino)propyl]-1,3-propane diamine, N-(3-aminopropyl)-N'-[3-(9-dodecylamino)propyl]-1,3-propane diamine, N-(3-aminopropyl)-N'-[3-(9-(coco alkyl)amino)propyl]-1,3-propane diamine, N-(3-aminopropyl)-N'-[3-(9-(rape seed alkyl)amino)propyl]-1,3-propane diamine, N-(3-aminopropyl)-N'-[3-(9-(soya alkyl)amino)propyl]-1,3-propane diamine, N-(3-aminopropyl)-N'-[3-(9-octadecenylamino)propyl]-1,3-propane diamine, N-(3-aminopropyl)-N'-[3-(9-(tallow alkyl)amino)propyl]-1,3-propane diamine, N-(3-aminopropyl)-N'-[3-(9-erucylamino)propyl]-1,3-propane diamine, and, N'-{3-[(3-aminopropyl)amino]propyl}-N,N-di-C16-18 alkyltrimethylenediamine. Commercial examples (ex AkzoNobel) of these products are Triameen® OV, Triameen C, Tetrameen® T, and Tetrameen OV Examples of fatty acids for use as starting materials for the amides of compounds of formula I and II are acetic acid, butanoic acid, hexanoic acid, 2-ethylhexanoic acid, n-octanoic acid, n-decanoic acid, 2-propylheptanoic acid, n-dodecanoic acid, coco fatty acid, myristic acid, palmitic acid, oleic acid, stearic acid, rape seed fatty acid, soya fatty acid, tallow fatty acid, tall oil fatty acid, and erucic acid.

Examples of (fatty alkyl)polyamines that can be used as starting materials for compounds of formula II are N,N-bis(3-aminopropyl)hexyl amine, N,N-bis(3-aminopropyl)(2-ethylhexyl)amine, N,N-bis(3-aminopropyl)n-octyl amine, N,N-bis(3-aminopropyl)decyl amine, N,N-bis(3-aminopropyl)(2-propylheptyl)amine, N,N-bis(3-aminopropyl)dodecyl amine, N,N-bis(3-aminopropyl)(coco alkyl)amine, N,N-bis(3-aminopropyl)tetradecyl amine, N,N-bis(3-aminopropyl)hexadecyl amine, N,N-bis(3-aminopropyl)stearyl amine, N,N-bis(3-aminopropyl)(rape seed alkyl)amine, N,N-bis(3-aminopropyl)(tallow alkyl)amine, N,N-bis(3-aminopropyl)(soya alkyl)amine, N,N-bis(3-aminopropyl)oleyl amine, and N,N-bis(3-aminopropyl)erucyl amine. Commercial examples of these products are Triameen® Y-12 and Triameen YT (ex AkzoNobel).

The acylation reaction can be performed with an acid, an acid anhydride or an acyl chloride. The acetylation reaction is most conveniently performed with acetic anhydride, but also, e.g., acetic acid or acetyl chloride may be used.

The present invention also relates to a method for inhibiting the agglomeration of gas hydrates in a conduit, where the conduit contains a flowing mixture comprising hydrocarbons with 1-4 carbon atoms and water and where hydrates are formed from the hydrocarbons and water; the method comprising the steps:

a) adding to the mixture at least one anti-agglomerant selected from the group of compounds as defined in formulae I and II in an amount that is effective to inhibit the agglomeration of hydrates at the prevailing temperature and pressure in the conduits b) flowing the mixture containing the anti-agglomerant through the conduit.

The concentrations of the anti-agglomerants are at least 0.05%, preferably at least 0.5%, by weight of the water phase, and at most 10%, preferably at most 5%, and most preferably at most 3%, by weight of the water phase. The exact amount of anti-agglomerant to be used depends, inter alia, on the structure of the anti-agglomerant, the water quality, the pressures applied, the temperatures involved, and the actual composition of the gas and/or oil. The anti-agglomerants of the invention in addition to their dispersing ability also have other useful properties, such as corrosion inhibiting ability. The anti-agglomerant is preferably added in the well head in a composition that may also contain other corrosion inhibitors and paraffin deposition inhibitors. Such a composition suitably contains a) 1 part by weight of at least one gas hydrate anti-agglomerant selected from the group of compounds as defined in formulae I and II, and b) 0.0001-0.1, preferably 0.001-0.05 parts by weight of a corrosion inhibitor and/or a paraffin deposition inhibitor per part by weight of gas hydrate anti-agglomerant.

Examples of suitable corrosion inhibitors are monomeric or polymeric nitrogen-containing compounds, such as a fatty amines, alkoxylated fatty amines, alkyl amidoamines alkyl imidazolines, and quartemary ammonium compounds. Suitable examples include tallow amines, N-(tallow alkyl)-trimethylene diamines, imidazolines, and quaternary amines.

Examples of suitable paraffin deposition inhibitors, also known as wax dispersants, are usually polymers with a polar moiety as well as hydrophobic side chains which are compatible with the oil and thus have dispersant properties in said oil. Suitable paraffin deposition inhibitors include alcohol esters of alpha-olefin maleic anhydride copolymers, ethylene vinyl acetate copolymers, and alcohol esters of polyacrylic acid.

Other additives that may be present in the compositions are foam depressors, such as silicone-containing compounds, glycol and polyglycols, polymers or co-polymers of N-vinyl-2-pyrrolidone as described in WO 1993/025798, biocides, metal complexants, such as citric acid, solubilizing agents, and additives for stabilizing the dispersion, as well as other dispersants.

It should be appreciated that the various aspects and embodiments of the detailed description as disclosed herein are illustrative of the specific ways to make and use the invention and do not limit the scope of invention when taken into consideration with the claims and the detailed description. It will also be appreciated that features from different aspects and embodiments of the invention may be combined with features from different aspects and embodiments of the invention. The term "consisting" wherever used herein also embraces "consisting substantially", but may optionally be limited to its strict meaning of "consisting entirely". Further, throughout the description and claims of this specification, the words "comprise" and "contain" and variations of the words, for example "comprising" and "comprises", mean "including but not limited to", and do not exclude other moieties, additives, components, integers or steps. Moreover the singular encompasses the plural unless the context otherwise requires: in particular, where the indefinite article is used, the specification is to be understood as contemplating plurality as well as singularity, unless the context requires otherwise. Where upper and lower limits are quoted for a property, for example for the concentration of the amide, then a range of values defined by a combination of any of the upper limits with any of the lower limits is also implied. Amounts, unless defined differently, are in weight percent (wt %). "Substantially free of" a certain component for the purpose of the present invention means that the content of such certain component in the composition is less than 10 wt %, more specifically less than 5 wt %, even more specifically less than 1 wt %, in particular less 0.5 wt %, and in one embodiment less than 0.1 wt %.

The following embodiments illustrate the invention and should not be construed as limiting the scope thereof.

EXAMPLES

Synthesis of Intermediate Fatty Amide

Triameen OV (ex AkzoNobel; 607.7 g, 1.489 mole) was melted and charged to a 2 liter flange flask equipped with mechanical stirrer, thermostat, Liebig condenser, vacuum and nitrogen flow control. At 70° C. oleic acid (405.60 g, 1.490 mole) was charged to the Triameen and temperature rose due to heat of neutralization. Temperature was set at 150° C. and nitrogen flow to 20%. At 150° C. water started to distill and temperature was then raised at a rate of about 10° C./30 min. After 4 hat 150-190° C. the amine value was analysed. Total amine value with potentiometric titration with 0.1 M HClO4 showed amine=2.40 meq/g. Although the amidation is a statistical process, most of the amide function will be on the nitrogen farthest from the nitrogen attached to the alkyl function of the Triameen OV.

Synthesis of Sample 12—Condensate of Oligomeric Amide with Oleyl and Acetyl Groups To the reaction flasks of parallel synthesis equipment "Radley carousel" equipped with 3 three-necked flasks (250 ml) with magnet-stirrers Triameen OV-oleyl amide (78.35 g, 0.118 mole) was charged. Reaction was started at 30° C. by addition of acetic acid anhydride (AAH, 29.6 g, 0.29 mole) to substitute remaining amine groups of the intermediate fatty amide. An exotherm increased the temperature to about 50° C. The reaction was left over night. Day 2 the temperature was increased to 90-100° C. for 4 h.

Water was added to quench the residual AAH.

There was no amine left according to NMR measurements.

Synthesis of Sample 13—Condensate of Oligomeric Amide with Oleyl and Butyl Groups To the reaction flasks of parallel synthesis equipment "Radley carousel" equipped with 3 three-necked flasks (250 ml) with magnet-stirrers Triameen OV-oleyl amide (75.28 g, 0.114 mole) was charged. Reaction was started at 30° C. by addition of butanoic acid anhydride (BAH, 45.5 g, 0.288 mole) to substitute remaining amine groups of the intermediate fatty amide. The exotherm increased the temperature to appr. 50° C. The reaction was left over night. Day 2 the temperature was increased to 90-100° C. for 4 h.

Water was added to quench the residual BAH.

There was no amine left according to NMR measurements.

Synthesis of Sample 14 Condensate of Oligomeric Amide with Oleyl, Butyl and Acetyl Groups To the reaction flasks of parallel synthesis equipment "Radley carousel" equipped with 3 three-necked flasks (250 ml) with magnet-stirrers Triameen OV-oleyl amide (74.60 g, 0.113 mole) was charged. Reaction was started at 30° C. by addition of butanoic acid anhydride (22.97 g, 0.145 mole) and acetic anhydride (14.98 g, 0.147 mole) to substitute remaining amine groups (non-amide N—H bonds) of the intermediate fatty amide. The AAH/BAH mixture was pre-mixed before addition to the amine/amide. The anhydrides reacted with the non-amide N—H bonds. The exotherm increased the temperature to approximately 50° C. The reaction was left over night. Day 2 the temperature was increased to 90-100° C. for 4 h. Thereafter water was added to quench any residual AAH and BAH.

There was no amine function left according to NMR measurements.

General about Rocking Cell Technique

The Rocking Cell technique is disclosed in Production Chemicals for the oil and gas industry, Malcolm A. Kelland, 2009, CRC Press, p 247, as well as WO/2010/104727 and WO/2005/116399, and is based on a purely visual observation of a ball displacement from side to side of a cell that is being rocked at a steady rate in a mixture of oil, water and gas under pressure and declining temperature. The main advantages of this technique are that it allows for direct observation of the formation of gas hydrates. If there are gas hydrates formed, then those will be spotted through a glass window, usually constructed of sapphire glass. If the formation of the hydrates is such that it impedes the movement of the ball, then that will also be spotted and conclude formation of agglomerates which will totally block the cell. For the examples presented below a rocking cell instrumentation RCS20 from PSL Systemtechnik with up to 20 cells was used.

Experimental Sapphire Multi-Cell Anti-Agglomerant Test Method

To a water phase (5 ml) or 0.5-1.5 wt % NaCl water solution, European white spirit (7 ml) was added. The mixture was cooled by a cool bath which was set to 18° C., pressure was increased to 90 bar. The Multi-cell was rocked at 15 rocks/min and then gradually cooled to 2° C. during approximately 12 hours. Then the temperature and pressure were held at 2° C. for 1 hr. After the cooling procedure the multi-cell was gradually warmed to 20° C. during approximately 4 hours and held at 20° C. for 1 hour. Additional cooling was performed by gradually lowering the temperature to 6° C. without rocking, followed by rocking for 10 hours at 6° C. The cells were then gradually warmed again to 20° C. during 3 hours.

The ranking in the rocking cell test is as follows:

A—fine dispersed hydrates, no deposits

B—No plugging is observed in video, but run time increased (No deposits but coarse hydrate particles)

C—Significant deposits, ball still moving slowly

D—plug of hydrate, run time decreases as the ball breaks up hydrate lumps after some hours E—plug of hydrate, ball stops moving Example 1

The comparison products X and Y, and the products 12, 13 and 14 according to the invention were investigated with the Rocking Cell technique, and the results are collected in the Table below.

| Product | Sea water (1.5% a.s) | Sea water (1% a.s) | Sea water (0.5% a.s) | Fresh water (1.5% a.s) | Fresh water (1% a.s) | Fresh water (0.5% a.s) | Shut in |
|---|---|---|---|---|---|---|---|
| Comparison X * | AA | BB | BB | | | | AA |
| Comparison Y ** | AB | CD | EE | | | | |
| 12 | AA | Not tested | Not tested | AA | Not tested | Not tested | |
| 13 | | AA | AA-BB | | AA-CC | AA-CC | |
| 14 | | AA | AA | | AA | AA, CC | AA |

* Diester of dibutyldiethanol ammonium bromide and coconut fatty acid.
** N-oleyl-trimethylene diamine diamidated with acetic anhydride The products 12, 13 and 14 have been described in the synthesis examples above, and all of these products have one long alkyl group, one long amide group and two short amide groups. In the tests with the Rocking Cell technique very fine dispersed gas hydrate crystals in the oil is resulting when these products are used. From the results in the Table it is evident that the products according to the invention are more efficient than the comparison dialkyl quat X and the monoalkyl diamide Y in both sea water and in fresh water.

The invention claimed is:

1. A method for inhibiting agglomeration of gas hydrates formed in a mixture including hydrocarbons and water, the method comprising:

preparing a surface-active nitrogen-containing compound having the following general formula I

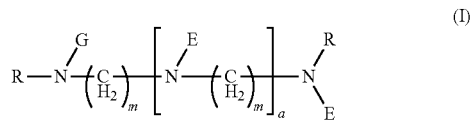

(I)

wherein R is H or a hydrocarbyl group having 2-24 carbon atoms, G is a hydrocarbyl group having 6-24 carbon atoms or E, whereby R and G are selected such that the compound has at least one hydrocarbyl group with 6-24 carbon atoms connected to a nitrogen atom; each E is independently H, CH3, —CH2CH3 or an acyl group —C(=O)Ri, wherein each —C(=O)$R_1$ is independently the acyl group having 2-24 carbon atoms; provided that at least one of the —C(=O)$R_1$ groups is the acyl group having 2-5 carbon atoms, and at least one —C(=O)$R_1$ is an acyl group having 6-24 carbon atoms; and provided that when both R is H, then there are at least two of —C(=O)$R_1$ that are the acyl group having 6-24 carbon atoms; m is 2 or 3; and a is a number from 1 to 3;

whereby in formula I E is selected such that the compound contains 2-7 amide groups, as an anti-agglomerant for gas hydrates; and adding the surface-active nitrogen-containing compound to the mixture to inhibit agglomeration of the gas hydrates.

2. The method according to claim 1 wherein the anti-agglomerant has formula I, wherein a=2, m=2 and R=H; the groups, and wherein two of the groups E are the acyl groups having 6-24 carbon atoms and one E is the acyl group having 4 carbon atoms.

3. The method according to claim 1 wherein the anti-agglomerant has formula I, wherein a=3, m=2 and R=H; the group, and wherein two of the groups E are the acyl groups having 6-24 carbon atoms, one E is the acyl group having 2 carbon atoms and one E is the acyl group having 4 carbon atoms.

4. The method according to claim 1 wherein the anti-agglomerant has formula I, wherein a=1, m=3 and one R is the hydrocarbyl group having 8-24 carbon atoms; wherein G is E, and wherein one of E is the acyl group having 6-24 carbon atoms, one of E is the acyl group having 4 carbon atoms and one of E is the acyl group having 2 carbon atoms.

5. The method according to claim 1 wherein the anti-agglomerant has formula I, wherein a=1, m=3 and one R is the hydrocarbyl group having 8-24 carbon atoms; wherein G is E, and wherein one of E is the acyl group having 6-24 carbon atoms and two of E are the acyl groups having 4 carbon atoms.

6. The method according to claim 1 wherein the anti-agglomerant has formula I, wherein a=2, m=3 and one R is the hydrocarbyl group having 8-24 carbon atoms; wherein G is the hydrocarbyl group having 8-24 carbon atoms, and wherein G and R are situated on the same carbon atom; and two of E are the acyl groups having 4 carbon atoms and one of E is the acyl group having 2 carbon atoms.

* * * * *